3,296,196
SILOXANE POLYMERS CONTAINING
ALLYLCINNAMATE GROUPS
Harry F. Lamoreaux, Schenectady, N.Y., assignor to General Electric Company, a corporation of New York
No Drawing. Filed June 1, 1964, Ser. No. 371,764
1 Claim. (Cl. 260—46.5)

This invention relates to modified siloxane polymers. More particularly, it relates to siloxane polymers which are useful as ultraviolet light absorbers and to the preparation thereof.

Prior art disclosure of ultraviolet light absorbing compositions which utilize organopolysiloxanes have shown either organopolysiloxane fluids comprising the reaction products of known organic ultraviolet light absorber compounds with various polysiloxane fluids or organopolysiloxane resins having ultraviolet light-absorber compounds incorporated as additives and not as an integral part of the polysiloxane molecule.

In the case of fluids, stable solid films are difficult to obtain because of the inherent disability of a fluid to form such a structure. With siloxane resins, that is, cross-linked polysiloxane materials, the amount of ultra-violet light absorption which could be accomplished was limited by the solubility of the additive in the resin.

On the other hand, the product of the present invention is an organopolysiloxane resin having an ultraviolet light absorptive organic compound integrally bonded to it. Thus, resinous organosiloxane compositions having integral ultraviolet light absorption properties can be prepared which are not subject to the prior art solubility limitations.

It is, therefore, one object of this invention to prepare a resinous organopolysiloxane compound having an ultraviolet light absorber integrally bonded to the polysiloxane structure.

It is a further object of this invention to provide a film-forming polysiloxane polymer having ultraviolet light absorption properties.

It is a still further object of this invention to provide a method for forming a resinous organopolysiloxane compound having an ultraviolet light absorber integrally bonded to the polysiloxane structure.

Briefly, in accordance with this invention, a resinous polysiloxane is prepared having integrally bonded radicals derived from allylcinnamate which act to screen ultraviolet light radiation. This resinous polysiloxane is produced by reacting allylcinnamate with siloxane compounds containing SiH groups and a catalyst known to promote condensation of the SiH groups with unsaturated radicals. In some cases, this is accomplished in the presence of a common solvent. The result is a cross-linked polysiloxane containing an integrally bonded ultraviolet light screening agent in the form of an allylcinnamate radical.

Allylcinnamate has the formula:

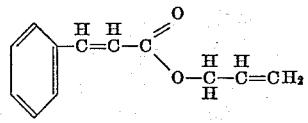

This compound is joined to the siloxane portion of the polymer by the reaction of the unsaturated portion of the allyl group with an SiH group in the siloxane reactant. This reaction can be represented as follows:

(1)
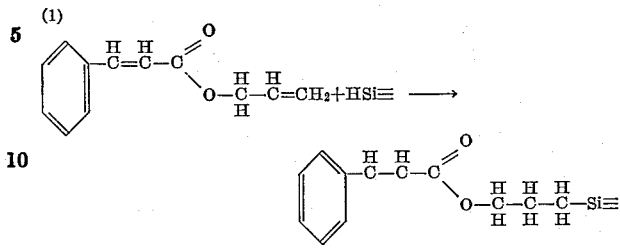

The SiH group, as will be described in more detail later, can be a portion of an existing silicone resin, or can be a part of a silicone fluid which reacts with a Si-vinyl containing fluid to form a resinous, cross-linked structure. The siloxane polymer of this invention should have between 5 and 50% of its silicon atoms substituted with the allyl-cinnamate radical in order to provide the desired sun-screening effect. Below 5% substitution, the polymer will absorb insufficient ultraviolet light to be practical. When more than 50% of the silicon atoms are substituted with allylcinnamate, additional sun-screening is provided, but this greater effect is not commensurate with the extra cost of the allylcinnamate reactant needed.

The cross-linked polysiloxane structure to which the allylcinnamate radical is joined can be supplied in a number of ways. The cross-linking can be in the form of silicon-oxygen-silicon bonds, such as in the standard organopolysiloxane resin structure, or can involve silicon-carbon-silicon bonds, such as those derived by the interaction of a Si-vinyl and SiH groups.

A particularly useful method of forming the cross-linked structure is the reaction between cyclic siloxanes having the formula:

(2)           $(RHSiO)_y$ where R is a monovalent hydrocarbon radical free of aliphatic unsaturation and y is an integral number of from 3 to 6, inclusive, and cyclic siloxanes having the formula:

(3)           $[R(CH_2=CH)SiO]_x$ where R is as previously defined and x is an integral number of from 3 to 6, inclusive. More specifically, the R substituent can be a member selected from the class consisting of alkyl, cycloalkyl, aryl, and aralkyl radicals. Illustrative of the R groups are alkyl groups, such as methyl, ethyl, propyl, etc.; cycloalkyl groups, such as cyclopentyl, cyclohexyl, etc.; aralkyl groups, such as tolyl, xylyl, ethylphenyl, etc.; and aryl groups, such as phenyl, naphthyl, para-phenoxyphenyl, etc. While any of the cyclic polysiloxanes defined by Formulae 2 and 3 above may be utilized in the formation of the ultraviolet light-screening polymer of the present invention, the cyclotetrasiloxanes, i.e., those siloxanes having four of the above-defined siloxane units are preferred. This preference is due to the greater ease of purification of the cyclotetrasiloxanes and, thus, the greater predictability of the constituency of the final product.

When the cyclic siloxanes containing SiH and Si-vinyl groups are reacted, a cross-linked structure results wherein the cross-links are —Si—CH₂CH₂Si— groups. The reaction may be represented as follows:

(4)
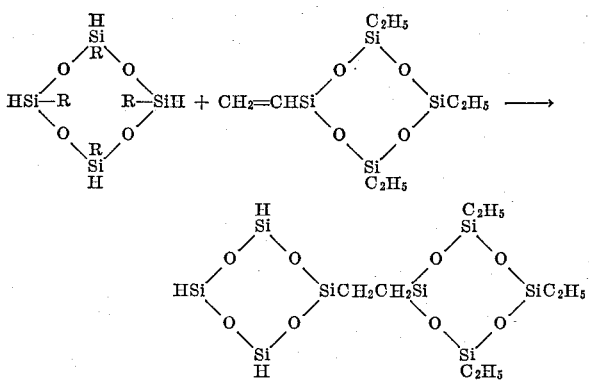

Addition cyclic siloxanes within the scope of Formula 2 and additional cyclic siloxanes within the scope of Formula 3 can react further with the two cyclic siloxanes which are joined by ethylene groups to form three-dimensional structures. Since the reaction of the allylcinnamate with the cross-linked structure is, as previously noted, also through the reaction of a SiH group and an unsaturated radical, a sufficient excess of the cyclic siloxane having the Formula 2 must be utilized so that sufficient SiH groups remain to allow the bonding of the desired percentage of allylcinnamate radicals.

Therefore, since from 5 to 50% of the silicon atoms should be substituted with allylcinnamate radicals in order to provide the proper amount of ultraviolet light absorption, the following number of moles of siloxane units from cyclic siloxanes and moles of allylcinnamate are to be used in forming the polymers of the present invention.

| Constituent | Minimum | Maximum |
| --- | --- | --- |
| ≡SiH units | 100 | |
| ≡SiCH=CH₂ units | 33.3 | 90.4 |
| Allylcinnamate Molecules | 9.6 | 66.7 |

Thus, between 0.333 and 0.904 Si-vinyl siloxane units and between 0.096 and 0.667 allylcinnamate molecules should be used for each SiH siloxane unit. The total of the Si-vinyl siloxane units and the allylcinnamate molecules should be equal to the number of SiH siloxane units present. Thus, a stoichiometric ratio of SiH groups and unsaturated groups are present, and between 5 and 50% of the silicon atoms will be substituted with allylcinnamate.

Further, the cross-linked polymeric structure to which the allylcinnamate can be joined can be formed by the interaction of fluid, straight-chain siloxanes having hydrogen and vinyl substituents. Such compounds can be represented by the formula:

(5) 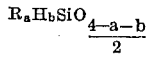 $R_aH_bSiO_{\frac{4-a-b}{2}}$ where R is as defined above, a is from 1.0 to 1.7, b is from 0.3 to 1.0, and the sum of a plus b is from about 2.0 to 2.1, and the formula:

(6) 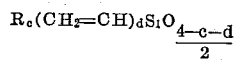 $R_c(CH_2=CH)_dSiO_{\frac{4-c-d}{2}}$ where R is as defined above, c is from 1.0 to 1.75, d is from 0.25 to 1.0, and the sum of c plus d is from about 2.0 to 2.1. The product produced by the interaction of the SiH and Si-vinyl containing fluids is somewhat less rigid than the cross-linked polymers produced by the methods previously described. However, because of the cross-linked structure, films can still be cast from the material. The ratio of material having the Formula 5 to material having the Formula 6 is controlled so that the materials are cross-linked by at least one-fourth of the silicon atoms in each chain, and so that between 5 and 50% of the total silicon atoms are linked to allylcinnamate units.

Still further, the allylcinnamate can be used with resinous polysiloxanes having the formula:

(7) 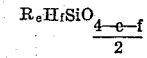 $R_eH_fSiO_{\frac{4-e-f}{2}}$ where R is as previously defined, e is from 1.15 to 1.65 and f is from 0.05 to 0.5, and the sum of e plus f is from 1.20 to 1.75. Such a resin is formed by the cohydrolysis of difunctional and trifunctional chlorosilanes, any of which can contain a silicon-bonded hydrogen atom to give the required percentage of hydrogen in the final resin. Among the compounds which can be cohydrolyzed to form such a resin are dimethyldichlorosilane, methyltrichlorosilane, diphenyldichlorosilane, phenyltrichlorosilane, methylphenyldichlorosilane, trichlorosilane, methyldichlorosilane, and phenyldichlorosilane. The ratio of the various chlorosilanes is such that the subscripts e and f attained are within the ranges described above. The products resulting from this technique have the formula:

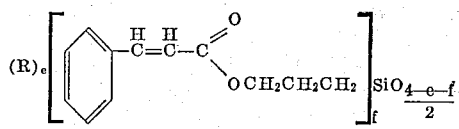

where R, e, f and the sum of e plus f are as described above.

The reaction conditions employed in preparing the polymers of the present invention vary considerably. When the polymer is formed from either the cyclic siloxanes of Formulae 2 and 3 or the SiH and Si-vinyl containing siloxane fluids of Formulae 5 and 6, the reaction is carried out in the absence of a solvent. The desired amounts of the SiH-containing siloxane, Si-vinyl-containing siloxane, and allylcinnamate are blended together and reacted at a temperature of from about 80 to 120° C. The order of addition of the various reactants is unimportant. A preferred temperature for the reaction is about 100° C., at which temperature the reaction requires approximately 16 hours. Obviously, as the temperature of reaction is increased, less time is required for completion, while at lower temperatures a corresponding increase in reaction time is required.

When a preformed resinous siloxane of the type shown by Formula 7 is used as a backbone for the sun-screen polymer, the reaction can be conducted in a solvent solution. The amount of solvent needed is only an amount which is sufficient to provide a stirrable solution. For example, equal portions of solvent and total reaction mixture can be used. The reaction of the allylcinnamate with SiH resin in this case is also conducted at about 80 to 120° C., with a time consumption of about ten hours. However, the reaction temperature is obviously limited by the boiling point of the solvent used in the reaction mixture. Therefore, it is preferred that the solvent have a boiling point of at least 100° C. Essentially, any material which acts as a common solvent for both the allylcinnamate and the siloxane, which has a boiling point in the range of 100° C. or higher and which is inert to the reactants under the conditions of the reaction, can be employed. Among such solvents are benzene, toluene, xylene, nonane, decane, or any other inert solvent having the required boiling point.

The catalyst which is used to promote the addition reaction between the SiH group and the unsaturated radical can be selected from any of the well-known SiH-olefin condensation catalysts. Among these may be mentioned platinum, platinum-on-charcoal, platinum-on-gamma alumina, platinum-on-silica gel, platinum-on-asbestos, and chloroplatinic acid ($H_2PtCl_6 \cdot 6H_2O$), as mentioned in Patent 2,823,218—Speier, and Patent 2,970,150—Bailey. Additionally, the catalyst can be a complex formed of chloroplatinic acid with up to two moles per mole of platinum of a member selected from the class consisting of alcohols having the Formula R'OH, ethers having the Formula R'OR', aldehydes having the Formula R'CHO, and mixtures of the above, as described and claimed in my copending application Serial No. 207,076, now Patent 3,220,972, filed July 2, 1962, and assigned to the same assignee as the present invention. The substituent R' in the above formulas is a member selected from the group consisting of alkyl radicals containing at least 4 carbon atoms, alkyl radicals substituted with an aromatic hydrocarbon radical, and alkyl radicals substituted with an OR" group where R" is a member selected from the group consisting of monovalent hydrocarbon radicals free of aliphatic unsaturation and monovalent radicals free of aliphatic unsaturation and consisting of carbon, hydrogen, and oxygen atoms with each oxygen atom being attached to two atoms, at least one of which is a carbon atom and up to one of which is a hydrogen atom. The amount of catalyst which should be present in the reaction mixture varies from about $6 \times 10^{-9}$ to $1 \times 10^{-5}$ moles of platinum per mole of silicon-bonded vinyl and allyl groups in the reaction mixture. In the case where the allylcinnamate is bonded simultaneously with the formation of the cross-linked silicon structure, a preferred range of catalyst is from about $4 \times 10^{-8}$ to $8 \times 10^{-8}$ moles of platinum per mole of the silicon-bonded vinyl and allyl groups. When the allylcinnamate is added to an already formed siloxane polymer, the range of catalyst should be from $4 \times 10^{-8}$ to $8 \times 10^{-8}$ moles of platinum per mole of allylcinnamate.

The following examples are illustrative of the formation of the products of this invention. They should not be considered as limiting in any way the full scope of the invention as covered by the appended claims.

Example 1

A mixture was prepared containing 34.4 gm. (0.10 mole) of 1,3,5,7-tetramethyl-1,3,5,7-tetravinylcyclotetrasiloxane, 30 gm. (0.125 mole) of 1,3,5,7-tetramethylcyclotetrasiloxane, and 18.8 gm. (0.10 mole) of allylcinnamate. To the mixture was added, as a catalyst, chloroplatinic acid in an amount sufficient to provide 0.016 milligram platinum. The ingredients were heated at 95 to 100° C. until the equivalent of a room temperature viscosity of 125 centistokes was reached, approximately 20 hours. The polymerized material was added to a quantity of toluene, such that a 25% solids solution was formed. This solvent solution was applied to a tin plate and heated at 125° C. for 20 minutes. This resulted in a resinous film comprising a plurality of cyclotetrasiloxane units joined together with silicon-ethylene-silicon linkages, with 11.1% of the silicon atoms containing the silicon-bonded radical derived from allylcinnamate. The film was removed from the tin by amalgamating the metal surface with mercury. The cured film had a thickness of 0.5 mil and, when it was removed from the base, was found to be completely opaque to ultraviolet light transmission.

Example 2

A composition is prepared containing 14.3 gm. (0.042 mole) of 1,3,5,7-tetramethyl-1,3,5,7-tetravinylcyclotetrasiloxane, 30 gm. (0.125 mole) of 1,3,5,7-tetramethylcyclotetrasiloxane, and 62.3 gm. (0.333 mole) of allylcinnamate. To this composition is added, as a catalyst, chloroplatinic acid in an amount of $8.65 \times 10^{-3}$ mg. ($10^{-7}$ moles Pt/mole [R(CH$_2$=CH)SiO]). The ingredients are heated at from 95 to 105° C. until the equivalent of a room temperature viscosity of 125 centistokes is reached. A solution is then prepared containing 20 gm. of the polymer and 80 gm. of xylene, a 25% solids solution. This solution is applied to a tin-plated steel plate and is heated at 125° C. for about 20 minutes. This results in a resinous film similar to that of Example 1, except that 50% of the silicon atoms contain radicals derived from allylcinnamate. The film is then removed by amalgamating the tin surface with mercury. The cured film, with a thickness of 0.3 mil is completely opaque to ultraviolet light transmission.

Example 3

A methyl hydrogen siloxane fluid having the approximate formula:

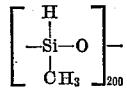

and a methylvinylpolysiloxane fluid having the approximate formula:

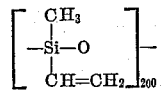

were mixed with allylcinnamate in an amount sufficient to provide one mole of methylvinylsiloxane units and two moles of methyl hydrogen siloxane units per mole of allylcinnamate and $2.4 \times 10^{-8}$ mole of platinum as choroplatinic acid are then added. The mixture is heated for 20 hours at 95° C. to a room temperature viscosity of about 125 centistokes. The partially polymerized material is then cast onto a tin-plated steel plate and is heated for one hour at 100° C. to form a cured film. This film was cross-linked with silicon-ethylene-silicon linkages and contained an average of 33.3% of its silicon atoms joined to a radical derived from allylcinnamate. The film, having a thickness of 1.0 mil, is removed by amalgamating the tin surface with mercury and is found to be completely opaque to ultraviolet light transmission.

Example 4

A cross-linked polysiloxane resin is formed by the cohydrolysis and condensation of 57.5 gm. (0.50 mole) of methyldichlorosilane [CH$_3$SiHCl$_2$], 50.6 gm. (0.20 mole) of diphenyldichlorosilane [(C$_6$H$_5$)$_2$SiCl$_2$], 31.8 gm. (0.15 mole) of phenyltrichlorosilane [C$_6$H$_5$SiCl$_3$], and 22.5 gm. (0.15 mole) of methyltrichlorosilane

[CH$_3$SiCl$_3$]

This product, formed as a 50% solution in toluene, corresponds to the formula:

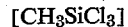

To 50 grams of the 50% toluene solution is added sufficient allylcinnamate to provide one mole per mole of silicon-bonded hydrogen and 0.3 mg ($6 \times 10^{-8}$ mole) of [H$_2$PtCl$_6 \cdot$6H$_2$O] as catalyst. The solution is heated at from 95 to 100° C. until a room temperature viscosity of 125 centistokes is reached. Subsequently, the solution is cast onto a tin-plated steel plate and is heated to about 125° C. for about 45 minutes to effect a cure. The hard film, having a thickness of about 2 mils, is tripped from the plate by amalgamating the tin with mercury. The film has a complete opaqueness to ultraviolet light and corresponds to the formula:

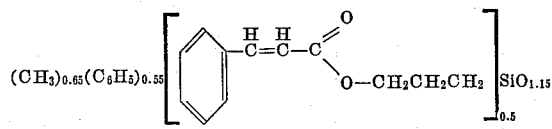

Because the ultraviolet light absorber additive is an integral part of the polymer and is not an additive to a chemically distinctive composition, the ultraviolet light absorbence of the compositions of the present invention can be adjusted at various levels. Thus, the amount of ultraviolet light absorbence which can be imparted to a given composition is not limited in any way by the solubility in the carrier.

The curable resinous, cross-linked polymer containing the allylcinnamate is susceptible to a variety of uses. For example, it can be used as a protective film in coating wood and plastics which are subject to outdoor exposure. Such protective films prevent fading and discoloration of the coated material, which the ultraviolet rays from the sunlight would otherwise cause. Further, it can be used as an interlayer between, or as a coating on, glass so as to prevent the fading of interior drapes, rugs, furniture, and other types of fabrics, which are subject to the same degradation when exposed to sunlight through ordinary glass. The polymer can be incorporated in a textile finish to eliminate color fading of clothing and other textiles subject to the action of sunlight. The polymer functions similarly in polishes formulated for furniture or automobiles. Because of the water whiteness of the polymer, the natural color, or the desired color which has been imparted to the particular structure, remains unimpaired.

The direct application of a polymer which must be cured at 125° C. to a material such as wood, or certain plastics, would provide little advantage due to the deterioration of the base material during curing. However, the polymer of this invention may be subjected to a solvent bodying operation, for instance, in the solvent carrier, to significantly increase the viscosity of the final polymer. Such a treatment, in effect, cross-links at least the majority of the material prior to the application to the base to be coated. In such a situation, a solvent solution of the polymer can be sprayed onto the base, and the solvent flash evaporated, to leave a coating without the excessive temperatures which would be required if curing on the base were necessary.

As the resinous, cross-linked structure of the polysiloxane containing the allylcinnamate ultraviolet light absorber is susceptible to formation as a self-sustaining, solid structure, it can be used in situations in which prior art fluid ultraviolet light absorbing polysiloxane compositions are not acceptable. As a particular example, sunglass lenses, including those capable of precision grinding for prescriptions, can be formed from the allylcinnamate-polysiloxane resinous material. Such lenses provide protection from direct sunlight and, because the resinous material is water white, the protection would be provided with no impairment of natural colors. Additionally, such materials are practically unbreakable.

While specific embodiments of the invention have been shown and described, the invention should not be limited to the particular methods of formation and compositions. It is intended, therefore, by the appended claim, to cover all modifications within the spirit and scope of this invention.

What I claim as new and desire to secure by Letters Patent of the United States is:

An ultraviolet light-absorbing, film-forming composition consisting essentially of a resinous, cross-linked organopolysiloxane, comprising a plurality of cyclotetrasiloxane units joined together with silicon-ethylene-silicon linkages, with from 5 to 50% of the silicon atoms of said organopolysiloxane being linked directly to allylcinnamate radicals having the formula:

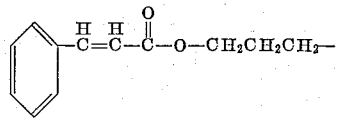

the organo groups of said organopolysiloxane being monovalent hydrocarbon radicals free of aliphatic unsaturation and being attached to silicon through silicon-carbon linkages.

References Cited by the Examiner

UNITED STATES PATENTS

| | | | |
|---|---|---|---|
| 2,721,873 | 10/1955 | MacKenzie et al. | 260—46.5 |
| 2,823,218 | 2/1958 | Speier et al. | 260—448.8 |
| 3,068,152 | 12/1962 | Black | 260—46.5 |
| 3,068,153 | 12/1962 | Morehouse | 260—46.5 |
| 3,159,662 | 12/1964 | Ashby | 260—46.5 |
| 3,179,612 | 4/1965 | Plueddemann | 260—448.8 |
| 3,197,433 | 7/1965 | Lamoreaux | 260—46.5 |

LEON J. BERCOVITZ, *Primary Examiner.*

M. I. MARQUIS, *Assistant Examiner.*